United States Patent Office 2,820,811
Patented Jan. 21, 1958

2,820,811

β-(5-ACENAPHTHENYL)-ACRYLONITRILES

Paul E. Hoch, Niagara Falls, N. Y., assignor to General Aniline & Film Corporation, New York, N. Y., a corporation of Delaware No Drawing. Application December 13, 1955
Serial No. 552,729

16 Claims. (Cl. 260—465)

This invention relates to new and useful compounds and their methods of manufacture, and more particularly to α(5-acenaphthenyl)-β-cyano-β-aryl-ethylenes and methods of making same.

The compounds of this invention may be represented by the following structural formula:

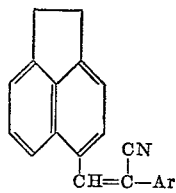

wherein Ar is a monocyclic or polycyclic unsubstituted or substituted carbocyclic aromatic substituent.

It has been discovered that new, useful and valuable compounds are obtained when acenaphthenaldehyde is condensed with cyanomethyl substituted aryl compounds. A general process for preparing the compounds of this invention involves condensing equimolecular amounts of aldehyde and the cyanomethyl compounds in the presence of a basic catalyst. It is advantageous in carrying out this condensation reaction to warm the reaction medium so as to accelerate the production of the condensation product. Temperatures which may be employed range from just above room temperature, that is, about 30° C., to about the reflux temperature of the reaction mass. The latter will of course vary depending upon the reactants and the specific solvent, if any, employed. Usually with ethanol as the solvent, the upper limit is about 90° C. The compounds of this invention are produced in substantially quantitative yield in from a few minutes to about 1 hour from the aforementioned reactants.

Among the mono- and polycyclic cyanomethyl substituted carbocyclic aromatic compounds which may be employed in this invention are the following:

Cyanomethyl-benzene
p-Cyanomethyl-anisidine
1-cyanomethyl-2-4-dimethoxy-benzene
1-cyanomethyl-4-diethylamino-benzene
1-cyanomethyl-2-diethylamino-benzene
1-cyanomethyl-4-acetamido-benzene
p-Cyanomethyl-cyano-benzene
α-Cyanomethyl-naphthalene
β-Cyanomethyl-naphthalene
1-cyanomethyl-2-methoxy-naphthalene
1-cyanomethyl-4-dimethylamino-naphthalene
1-cyanomethyl-4-diethylamino-naphthalene
1-cyanomethyl-4-acetamido-naphthalene The basic catalyst which may be employed to effect the desired condensation reaction include sodium methoxide, sodium ethoxide alcoholic potassium hydroxide, alcoholic sodium hydroxide, piperidine and the like.

The following examples will serve to illustrate the present invention without being limitative thereof:

Example 1

To a solution in ethanol of equimolecular amounts of 5-acenaphthenaldehyde and benzyl cyanide there is added 2 cc. of a 2% solution of sodium ethoxide. The mixture is then warmed gently to about 60° C. for ½ hour. A bright orange crystalline solid separates in substantially quantitative yield. The solid is recovered as a dry product and exhibits a vivid orange yellow fluorescence in both daylight and under ultraviolet radiation. The product has the formula:

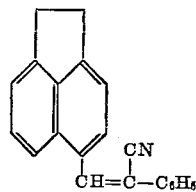

Example 2

To a solution in ethanol of equimolecular gram weights of 5-acenaphthenaldehyde and 1-cyanomethyl-naphthalene there is added 1 cc. of a 2% sodium methoxide solution. The solution is then heated to 50° C. for 1 hour, after which there is deposited in quantitative amounts bright orange crystals. The product has the formula:

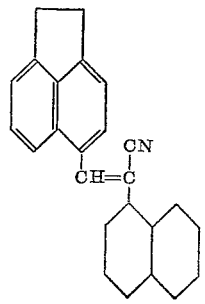

and exhibits strong daylight and ultraviolet fluorescence.

Example 3

The procedure of Example 1 is repeated employing in lieu of the benzyl cyanide, p-cyanomethyl-anisidine. The resultant product exhibits strong orange fluorescence in daylight and under ultraviolet radiation, and has the following formula:

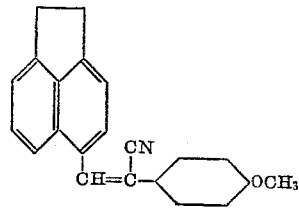

Example 4

To a solution in ethanol of equimolecular gram weights of 5-acenaphthenaldehyde and 1-cyanomethyl-4-acetamido-benzene there is added 2 cc. of a 10% alcoholic potassium hydroxide solution. The reaction mixture is then heated to 70° C. for 25 minutes. An orange crystalline solid separates out which is recovered as a dry product exhibiting very bright orange daylight and ultraviolet fluorescence. This product has the formula:

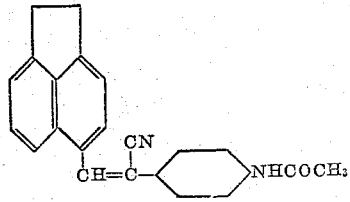

Example 5

To an ethanol solution containing equimolecular gram weights of 5-acenaphthenaldehyde and 1-cyanomethyl-2-methoxy-naphthalene there is added 3 cc. of piperidine. The solution is then heated to 75° C. for 45 minutes, after which time an orange crystalline product separates and has the following formula:

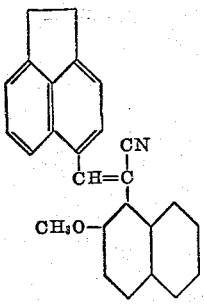

This product displays a vivid red-orange daylight and ultraviolet fluorescence.

Example 6

To a solution in ethanol of equimolecular amounts of 5-acenaphthenaldehyde and p-cyanomethyl-benzonitrile there is added 2 cc. of a 3% sodium methoxide solution. This solution is heated at 40° C. for 40 minutes and a bright orange-red crystalline solid separates in substantially quantitative yield. This solid is isolated and dried and exhibits a very vivid red-orange daylight and ultraviolet fluorescence. It has the following structure:

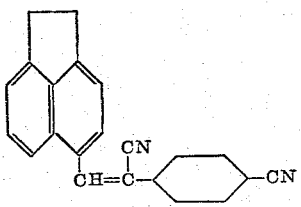

Example 7

1 g. of the product described in Example 1 in finely divided form is worked into 200 g. of cellulose acetate employing the conventional hot roll technique. The resultant product exhibits a uniform and vivid yellow-orange fluorescence in daylight.

The products of this invention by virtue of their outstanding and vivid fluorescent properties in daylight and when subjected to ultraviolet radiation may be employed in any and all of the ways that such products have heretofore been employed. Thus they may be incorporated in coating compositions of a thermoplastic or thermosettable nature, in molding plastics, in thermoplastic filaments, yarns and the like, in lacquers and other coating compositions such as printing inks and the like. The compounds of this invention may be employed for the aforementioned purposes in solid particular form or they may be dissolved in a suitable selective solvent compatible with any of the above-mentioned compositions. While the above description has been limited to a disclosure of 5-acenaphthenaldehyde as the aldehyde moiety of the condensation products of this invention, it is apparent that substituted derivatives of this compound may be employed wherein said substituents are of an inert nature and do not interfere with the course of the condensation reaction. Such substituents include alkyl, alkoxy, halogen, hydroxy, and other equivalent radicals. In the above examples it is also apparent that other solvents besides ethanol may be employed where desired in the condensation reaction. Such solvents include isopropanol, butanol, acetone and the like. Also the various basic condensation catalysts may be added in the form of solutions similar to those used in the condensation reaction.

Variations of the various specific embodiments of this invention may of course be made without departing from the spirit and scope thereof and it is to be understood that the invention is not limited by such specific embodiments.

I claim:

1. Compounds of the following formula:

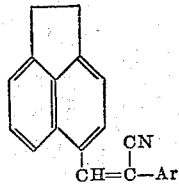

wherein Ar represents a carbocyclic aromatic radical.

2. α(5-acenaphthenyl)-β-cyano-β-aryl-ethylenes of the following formula

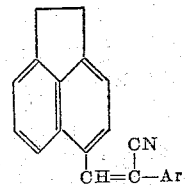

wherein Ar represents a radical selected from the group consisting of monocyclic and bicyclic unsubstituted and substituted carbocyclic aromatic nuclei.

3. α(5-acenaphthenyl)-β-cyano-β-phenyl-ethylene.
4. α(5-acenaphthenyl)-β-cyano-β-naphthyl-ethylene.
5. α(5 - acenaphthenyl) - β - cyano - β - (4 - methoxyphenyl)-ethylene.
6. α(5 - acenaphthenyl) - β - cyano - β - (4 - acetamidophenyl)-ethylene.
7. α(5 - acenaphthenyl) - β - cyano - β - (4 - cyanophenyl)-ethylene.
8. A process for the preparation of α(5-acenaphthenyl)-β-cyano-β-aryl-ethylenes which comprises condensing 5-acenaphthene-aldehyde with a cyanomethyl carbocyclic aromatic compound in the presence of a basic catalyst.
9. A process for preparing α(5-acenaphthenyl)-β-cyano-β-aryl-ethylenes which comprises reacting 5-acenaphthene-aldehyde with a cyanomethyl derivative of a carbocyclic aromatic compound in the presence of a basic catalyst.
10. A process for the preparation of α(5-acenaphthenyl)-β-cyano-β-aryl-ethylenes which comprises reacting 5-acenaphthene-aldehyde with a compound having the formula

wherein Ar is a radical selected from the group consisting of monocyclic and bicyclic substituted and unsubstituted carbocyclic nuclei at an elevated temperature in the presence of a basic catalyst.

11. A process as defined in claim 10 wherein the basic catalyst is sodium ethoxide.

12. A process as defined in claim 11 wherein the cyanomethyl compound is cyanomethyl-benzene.

13. A process as defined in claim 11 wherein the cyanomethyl compound is p-cyanomethyl-anisidine.

14. A process as defined in claim 11 wherein the cyanomethyl compound is p-cyanomethyl-acetaniline.

15. A process as defined in claim 11 wherein the cyanomethyl compound is cyanomethyl-naphthalene.

16. A process as defined in claim 11 wherein the cyanomethyl compound is cyanomethyl-benzonitrile.

References Cited in the file of this patent

UNITED STATES PATENTS

| | | |
|---|---|---|
| 2,286,363 | Hechenbleikner | June 16, 1942 |
| 2,307,700 | Moore | Jan. 5, 1943 |

OTHER REFERENCES

Corre et al.: Chem. Abst., vol. 43, pg. 4746 (1949).

Buu-Hoi et al.: Chem. Abst., vol. 45, page 8509 (1951).